United States Patent Office 2,744,589
Patented May 8, 1956

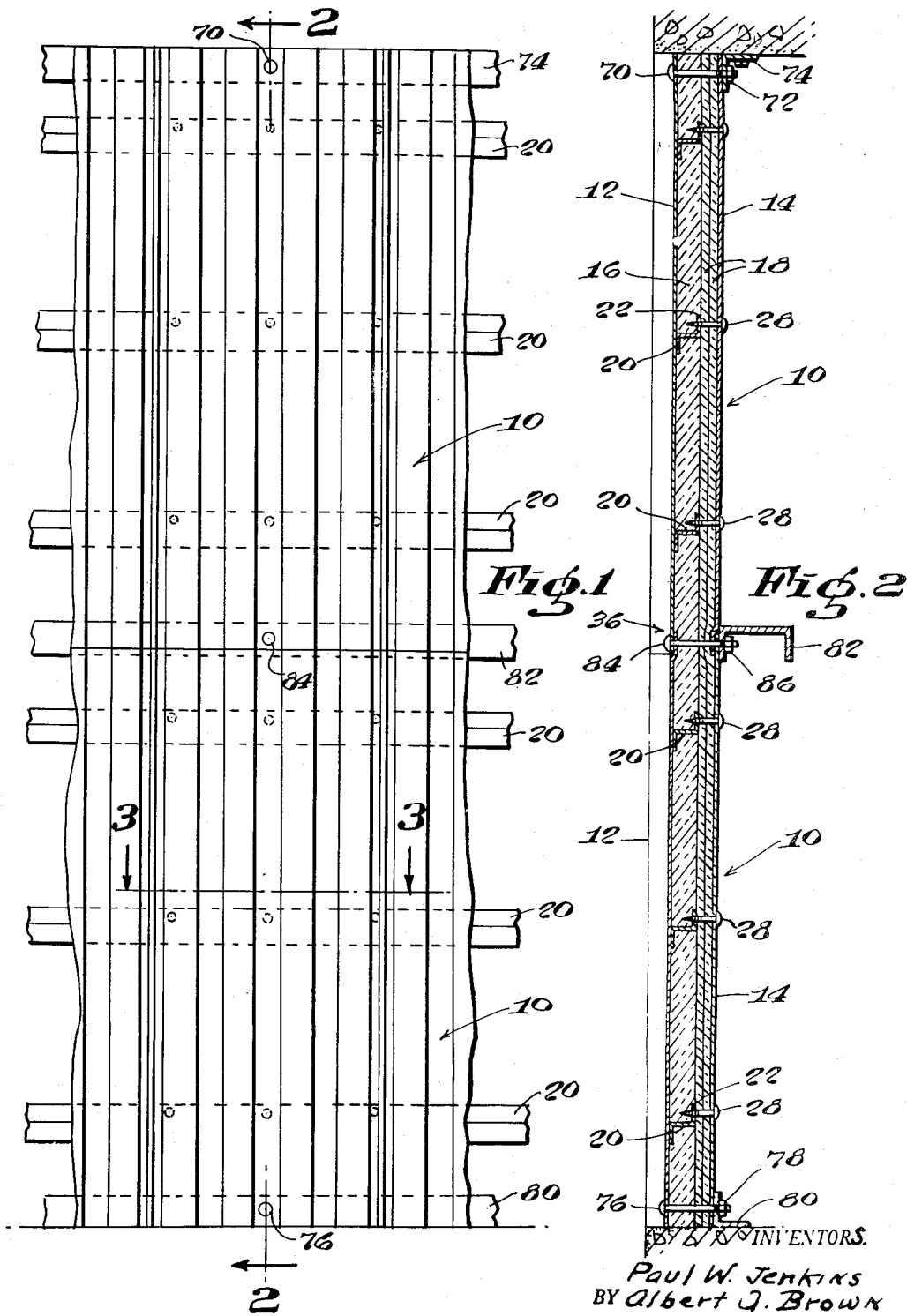

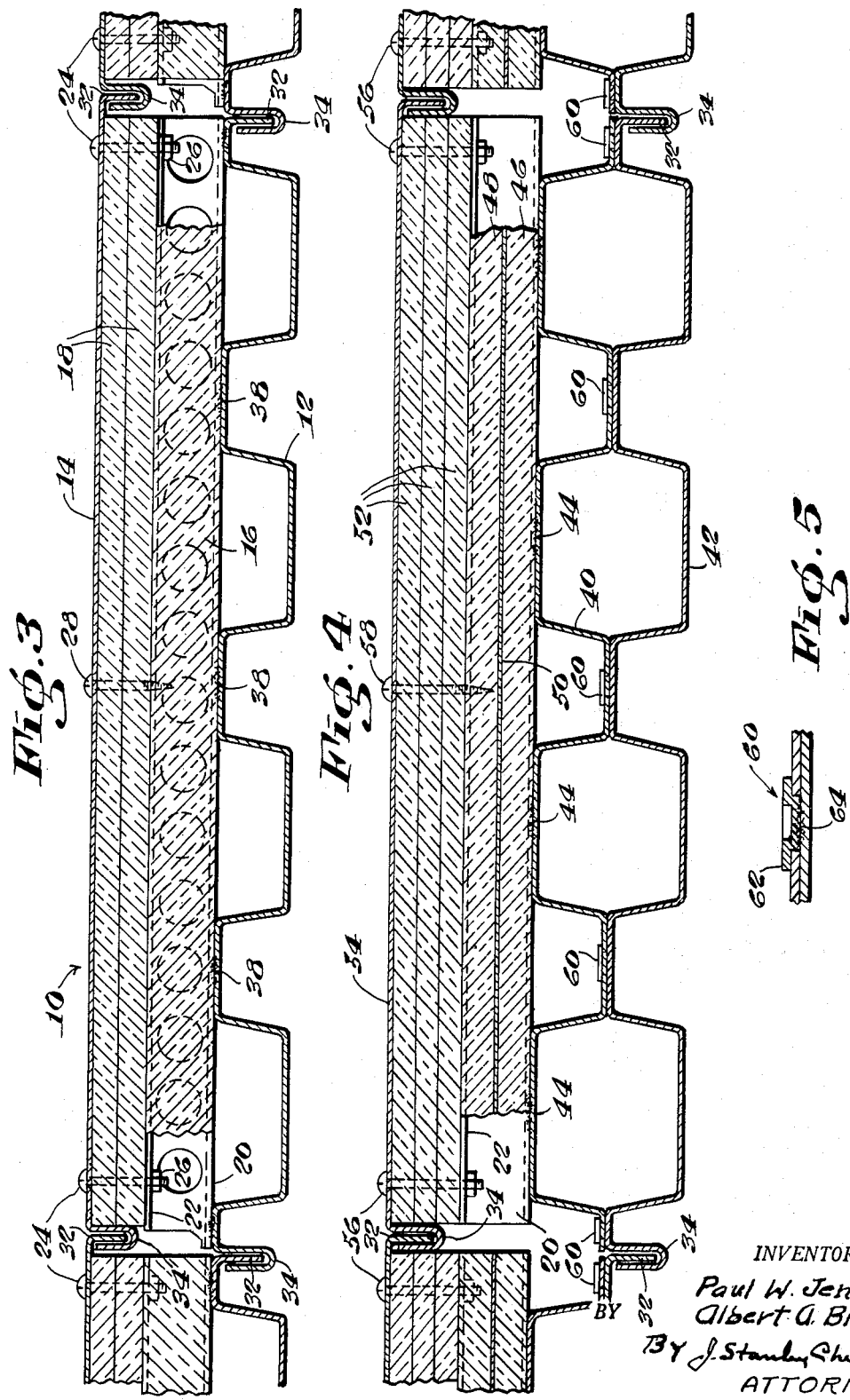

2,744,589
WALL-PANEL STRUCTURE

Paul W. Jenkins and Albert A. Brown, Pittsburgh, Pa., assignors to H. H. Robertson Company, Pittsburgh, Pa., a corporation of Pennsylvania Application October 26, 1951, Serial No. 253,356

2 Claims. (Cl. 189—34)

This invention relates to a wall panel and particularly to fire-resistive insulated wall-panel unit.

The invention has for an object to provide a novel and improved wall-panel unit having superior insulating and fire-resisting characteristics which may be economically manufactured and easily erected to form the walls of a building.

With this general object in view, and such others as may hereinafter appear, the invention consists in the fire-resistive insulated panel unit hereinafter described and particularly defined in the claims at the end of this specification.

In the drawings illustrating the preferred embodiment of the invention, Fig. 1 is a front elevation of a wall embodying the present panel units; Fig. 2 is a cross-sectional view taken on the line 2—2 of Fig. 1; Fig. 3 is a cross-sectional detail view of a panel unit taken on the line 3—3 of Fig. 1; Fig. 4 is a cross-sectional view, similar to Fig. 3, illustrating a modified form of panel unit embodying the present invention; and Fig. 5 is an enlarged detail view in cross section of a welded fastening member.

In general, the present invention contemplates a novel prefabricated insulated wall-panel unit for use in the construction of the walls of a building and which comprises an insulated panel unit embodying two spaced sheet-metal outer components or facing sheets, each having associated therewith an insulating member of substantial thickness and which cooperate in the complete unit when erected to form in effect a double insulating core. The insulation members may and preferably will be of different materials for a purpose to be described. Provision is made for securing together the facing sheets and the insulating layers by a plurality of transversely extended and vertically spaced tie bars secured to one of the facing sheets and defining areas into which one layer of the double insulating core may be placed. The second insulating member may be erected upon the first layer and upon the tie bars and secured to the tie bars by bolts extended through the second facing sheet and the second layer of insulation to provide an efficient fire-resistive wall panel which may be economically produced and quickly and easily assembled.

The illustrated insulated wall panel also provides a structure which lends itself to the provision of various thicknesses of insulating layers depending on the fire-resistive characteristics desired, and also lends itself to being readily erected, demounted and reerected when it is desired to alter the position of the wall without destroying or impairing the usefulness of the panel units.

In practice, the facing sheet forming the interior-wall surface may be flat, and the facing sheet forming the exterior-wall surface may be corrugated or cellular, the flutes or the cells forming relatively large closed air spaces between the fluted or cellular portions of the exterior-facing sheet and the insulation, thereby further increasing the fire-resistive characteristics of the composite insulating wall panel. Provision is also preferably made for assembling the panels in a manner such as to enable the exterior-wall surface of the structure to be free of visible fastening means.

Referring now to the drawings, the novel prefabricated insulated metal panel unit, illustrated therein and indicated generally at 10, comprises a fluted or corrugated sheet-metal facing member 12 forming the exterior-wall surface, a flat sheet-metal facing member 14 forming the interior-wall surface, and a double insulating and fire-resistive core comprising preformed, semirigid non-combustible layers or boards 16, 18 of substantial thickness interposed between and cooperating with the metal facing sheets 12, 14.

In the preferred embodiment of the invention, the preformed insulating boards 16 associated with the exterior-facing sheet 12 may comprise a rock-wool insulating material, and the insulating boards 18 associated with the interior-facing sheet 14 may and preferably will comprise one or more layers or sheets of gypsum or similar fire-resistive insulating material.

In the embodiment of the invention illustrated in Fig. 3, the facing sheets 12, 14 may comprise metal-coated steel sheets and are arranged to be connected together and to the insulating boards by intervening tie pieces or spacers herein shown as comprising transversely extended and vertically spaced Z-shaped bars 20 also preferably fabricated from metal-coated sheet steel and welded across the tops of the corrugations on the inner side of the corrugated facing sheets 12. In practice, the spaced Z-shaped tie pieces 20 may define areas or pockets into which the insulating boards 16 may be placed during the assembly of a panel unit, the insulating board or layer 16 being of a thickness corresponding substantially to the height of the Z bars. The second body of insulation 18, shown in Fig. 3 as comprising two individual layers placed one on the other, may be placed against the insulating layer 16 and across the laterally extended flanges 22 of the Z bars, the flanges 22 forming level surfaces or lands against which the insulating boards 18 rest. The insulating boards 18 are secured to the Z bars at the marginal sides of the panel by bolts 24 extended through the interior-facing sheets 14, the insulating layers 18 and the flanges 22 of the Z bars, and the bolts are arranged to cooperate with nuts 26 bearing against the underside of the flanges 22 to secure the insulating boards 18 and the facing sheet 14 to the Z bars 20. The boards 18 placed across the flanges 22 and against the boards 16 serve to hold the latter in place in the pockets formed in the exterior-facing sheet 12. Additional fastening elements disposed along the center of the panel may comprise self-tapping screws 28 which may also be extended through the facing sheets 14, insulating boards 18, and into the flanges 22, as shown. The Z bars 20 may also be provided with a plurality of equally spaced circular openings 30 to reduce the weight of the assembled structure.

In practice, the individual wall-panel units are preferably prefabricated in the shop ready for erection with other panel units in the field, and as herein shown, each facing sheet is provided with marginal male and female lips 32, 34 along the vertical side edges which are arranged for interlocking engagement with corresponding marginal lips of adjacent panel units for joining the panels side by side during the erection of the wall. The panels may be made in suitable standard lengths for forming the outer walls of a building, and when the height of a wall section to be formed exceeds the maximum standard length of a single panel, the ends thereof may be die-set, as indicated at 36, to provide offset portions arranged for telescopic engagement in a manner such as to provide smooth exterior end lap joints.

The preferred manner of assembling an individual wall-panel unit in the shop is to first secure the Z-shaped tie bars 20 to the corrugated facing sheet 12 by spot welding the bars to the inner corrugations, as indicated at 38, to provide a smooth and uninterrupted exterior surface free from visible fastening means. The semirigid insulating boards 16 may be provided in suitable sections formed to fit into the areas defined by the Z bars 20 and the width of the panel and are set in place against the inner corrugations of the facing sheet 12. The insulating boards 18 may then be placed on top of the boards 16 and across the Z bars 20, and the flat facing sheet may be placed on top of the insulating boards 18 and secured to the flange 22 of the Z bars by the bolts 24 and the self-tapping screws 28. In the process of securing the facing sheet 14, the insulating layers 18 may be slightly compressed to provide a relatively rigid panel assembly. It will be observed that the male and female lips 32, 34 of opposed facing sheets 12, 14 are preferably slightly offset with relation to each other so that assembly of two adjacent panels may be effected by moving one panel into the plane of the adjacent panel.

It will also be observed that the manner of attachment of the facing sheet 14 permits a body of insulation 18 of different thicknesses to be interposed between the insulating body 16 and the flat sheet by merely lengthening the fastening element securing the same to the Z-shaped bars.

In the modified form of the invention, as illustrated in Fig. 4, designed for resisting the effect of a fire for a substantially longer period of time, the exterior-wall facing sheet may comprise a cellular structure formed by placing two corrugated sheets 40, 42 together back to back and welding the same along the contacting web portions. The transversely extended and vertically spaced Z bars 20 may be spot welded to the corrugations of the cellular structure, as indicated at 44, and a body of insulation, herein shown as comprising two layers or boards 46, 48 of rock wool separated by a felt-separator sheet 50, may be placed in the areas defined by the Z bars and the width of the sheet. The second body of insulation in the modified form of the invention may comprise three layers or boards 52 of gypsum which may be placed against the first body of insulation and across the flanges of the Z bars. The flat interior-facing sheet 54 may then be placed on top of the insulating boards 52 and secured to the flange of the Z bars by bolts 56 and self-tapping screws 58.

In the modified form of the invention, the flat facing sheet 54 and the outer corrugated sheet 42 of the cellular structure may comprise sheet aluminum, and the inner corrugated sheet 40 and the Z bar 20 may comprise metal-coated steel. The Z bar 20 and the corrugated sheet 40 being made from similar metals may be spot welded directly to each other as described. However, the two contacting corrugated sheets 40, 42, being fabricated from dissimilar metals such as to preclude direct welding, may and preferably will be joined at the web portions by welding buttons 60 having a head portion 62 arranged to engage the inner surface of the web of the steel sheet 40, and having a welding portion 64 extended through a preformed opening in the steel web and into flush engagement with the adjacent surface of the aluminum web, as illustrated in detail in Fig. 5. The welding button may be made from the same material as the sheet to which it is welded, in the present instance aluminum, and when the buttons are placed in position, as illustrated, they may be spot welded to the outer corrugated sheet 42 in the usual manner to provide a smooth and uninterrupted exterior surface free from visible fastening means.

In the erection of a wall, such as is shown in Fig. 1, a series of insulated panel units 10 are secured in contiguous relation with the male lips 32 of one panel in interlocking engagement with the female lips 34 of the corresponding member of the adjacent panel, the lips being preferably provided with a caulking compound before erecting the panels, and the upper and lower ends of adjacent panels are telescopically interlocked, as illustrated at 36. The wall panels may be secured to the building framework in any usual or preferred manner, and as herein shown, the upper ends of the panel units may be bolted, as by bolts 70 and nuts 72 to one flange of an angle support 74 attached to the building, and the lower ends of the panel units may be similarly secured by bolts 76 and nuts 78 to one flange of an angle support 80 attached to the floor of the building, as illustrated in Fig. 2. A third supporting member comprising a horizontal channel support 82 forming a part of the building structure may be provided at the end lap joint 36 and to which the panel units are secured by bolts 84 and nuts 86.

From the above description it will be observed that the present construction of panel unit provides a unitary relatively rigid insulating wall having highly efficient fire-resistive characteristics insuring its maintenance in efficient condition for relatively long periods of time when when exposed to fire conditions. The present panel units are light in weight, may be economically manufactured and may be quickly and easily erected, and also lend themselves to being easily demounted and reerected when it is desired to alter the position of a wall section without destroying or impairing the structural integrity of the panel units.

The combinations of materials used in forming the double insulating members enable a wide variation to be had in the fire-resistive characteristics of the panels to comply with varying building-code requirements.

While the preferred embodiment of the invention has been herein illustrated and described, it will be understood that the invention may be embodied in other forms within the scope of the following claims.

Having thus described the invention, what is claimed is:

1. A lightweight elongated unitary panel assembly comprising two spaced apart sheet-metal facing sheets of substantially equal width and length having male and female lips on the side edges thereof, one sheet being flat and the other sheet being shaped to form a relatively few, wide and deep parallel corrugations extended lengthwise of the sheet and spaced uniformly across the width thereof, a plurality of transversely extended metal spacing members, each provided with an inner and outer flange and an intervening web portion, said flanges extending parallel to the plane of the flat facing sheet, the outer flange of each spacing member contacting and being welded to crest portions of the corrugated sheet, the webs of said spacing members being of a width to dispose the inner flange thereof spaced from the flat facing sheet, a layer of fibrous insulating material between the inner flanges of the spacing members and the corrugated facing sheet and at least two layers of substantially rigid preformed insulating members between the inner flanges of the spacing members and the flat facing sheet, and a plurality of fastening members extending through the flat facing sheet, through the substantially rigid insulating members, and through the inner flanges of the spacing members, said two layers of preformed insulating members being slightly compressed over their entire area between the inner facing sheet and the first mentioned insulating layers upon securing of said fastening members.

2. A lightweight elongated unitary panel assembly comprising two sheet-metal facing units, one unit comprising a flat sheet and the other unit comprising two corrugated sheets, each having relatively wide and deep corrugations spaced by intervening web portions, said corrugated sheets being assembled with the corrugations facing each other and with the intervening web portion welded together to form a cellular sheet-metal unit, each facing unit being provided with male and female lips on the side edges thereof, a plurality of transversely extended metal spacing members, each provided with an inner and outer flange and an intervening web portion, said flanges being disposed parallel to the plane of the flat facing sheet and the outer flange of each spacing member contacting and being welded to inner crest portions of the cellular unit, the webs of said spacing members being of a width to dispose the inner flanges thereof spaced from the flat facing sheet, a plurality of layers of fibrous insulating material between the inner flanges of the spacing members and the corrugated facing sheet and at least two layers of substantially rigid preformed insulating members between the inner flanges of the spacing members and the flat facing sheet, and a plurality of fastening members extending through the flat facing sheet, through the substantially rigid insulating members, and through the inner flanges of the spaced members, said two layers of preformed insulating members being slightly compressed over their entire areas between the inner facing sheet and the first mentioned insulating layers upon securing of said fastening members.

References Cited in the file of this patent
UNITED STATES PATENTS

| | | |
|---|---|---|
| 1,241,685 | Van Dorn | Oct. 2, 1917 |
| 2,245,611 | Schultz | June 17, 1941 |
| 2,284,229 | Palmer | May 26, 1942 |
| 2,590,687 | Crafton | Mar. 25, 1952 |